United States Patent
Logsdon et al.

(10) Patent No.: US 7,119,326 B2
(45) Date of Patent: Oct. 10, 2006

(54) METHOD AND APPARATUS FOR TESTING AN INFRARED SENSOR

(75) Inventors: James H. Logsdon, Kokomo, IN (US); Pedro E. Castillo-Borelly, Kokomo, IN (US); Abhijeet V. Chavan, Maple Grove, MN (US); Michael P. Donahue, Kokomo, IN (US); Deron K. Slaughter, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 13 days.

(21) Appl. No.: 10/905,151

(22) Filed: Dec. 17, 2004

(65) Prior Publication Data

US 2006/0131495 A1    Jun. 22, 2006

(51) Int. Cl.
*G01D 18/00* (2006.01)
*G12B 13/00* (2006.01)

(52) U.S. Cl. .................................. 250/252.1
(58) Field of Classification Search ............ 250/252.1
See application file for complete search history.

(56) References Cited

U.S. PATENT DOCUMENTS

| | | | | |
|---|---|---|---|---|
| 4,885,463 | A | * | 12/1989 | Wellman et al. ......... 250/252.1 |
| 5,122,661 | A | | 6/1992 | Kruszewski |
| 5,602,389 | A | | 2/1997 | Kato et al. |
| 6,191,420 | B1 | * | 2/2001 | Souma ..................... 250/338.1 |
| 6,528,789 | B1 | * | 3/2003 | Oda ........................ 250/338.1 |
| 6,793,389 | B1 | | 9/2004 | Chavan et al. ............. 374/179 |
| 2002/0069909 | A1 | * | 6/2002 | Kubo ........................ 136/224 |
| 2003/0146384 | A1 | | 8/2003 | Logsdon et al. ......... 250/338.1 |
| 2003/0147449 | A1 | | 8/2003 | Chavan et al. ............. 374/137 |
| 2003/0148620 | A1 | | 8/2003 | Chavan et al. ............. 438/706 |
| 2004/0178344 | A1 | * | 9/2004 | Taniguchi et al. ....... 250/338.3 |

OTHER PUBLICATIONS

Copy of EP Search Report dated Apr. 20, 2006.

* cited by examiner

*Primary Examiner*—David Porta
*Assistant Examiner*—Mark R. Gaworecki
(74) *Attorney, Agent, or Firm*—Jimmy L. Funke

(57) ABSTRACT

A method and apparatus for evaluating the functionality and sensitivity of an infrared sensor to infrared radiation. The method and apparatus are adapted for testing an infrared sensor having a diaphragm containing a heating element and a transducer that generates an output responsive to temperature. The method entails placing the infrared sensor in a controlled environment, and then exposing the diaphragm of the sensor to different levels of thermal radiation so as to obtain outputs of the transducer at different output levels. In the absence of exposure of the diaphragm to thermal radiation, flowing current through the heating element at different input levels so that the output of the transducer returns to the different output levels obtained using thermal radiation, the input difference between the input levels can be computed and used to assess the functionality and the sensitivity of the sensor.

27 Claims, 5 Drawing Sheets

METHOD AND APPARATUS FOR TESTING AN INFRARED SENSOR

BACKGROUND OF THE INVENTION

The present invention generally relates to thermopile-based thermal sensors. More particularly, this invention relates to a method and apparatus for performing self-testing of an infrared sensor.

A thermopile comprises a series of connected thermocouples, each made up of dissimilar electrically-resistive materials such as semiconductors and metals, and converts thermal energy into an electric voltage by a mechanism known as the Seebeck effect. The general structure and operational aspects of thermopiles are well known and therefore will not be discussed in any detail here.

Thermopiles have been employed in infrared sensors, a notable example being commonly-assigned U.S. Pat. No. 6,793,389 to Chavan et al., which discloses a thermopile transducer and signal processing circuitry combined on a single semiconductor substrate so that the transducer output signal (measured in volts) is sampled in close proximity by the processing circuit. The sensor comprises a frame surrounding a diaphragm on which the transducer is fabricated. The frame is formed of a semiconductor material that is not heavily doped, and signal processing circuitry is fabricated on the frame and electrically interconnected with the transducer so as to minimize signal noise. In particular, the close proximity between the transducer and the signal processing circuitry minimizes capacitive and inductive coupling to off-chip sources of electric and magnetic fields that would be potential sources of extraneous signals. Fabrication of the sensor structure does not require high dopant concentrations or thermal treatments that are incompatible with standard CMOS devices, such that the signal processing circuitry can make use of CMOS and BiCMOS technology. The sensor also does not require the use of materials and process steps that are not conducive to mass production processes made possible with CMOS and micromachining technology.

An optional feature of the sensor disclosed by Chavan et al. is the incorporation of a heating element that surrounds a central heat-absorption zone of the sensor diaphragm. For convenience, the heating element can be formed of polysilicon or another material deposited in the fabrication of the sensor or signal conditioning circuitry, the latter of which can be used to send current to the heating element to raise the temperature of the central heat-absorption zone of the diaphragm. This capability can be used as a self-test mechanism to determine if the transducer is functioning properly after packaging and installation in the field. By switching two different currents into the heating element, a change in transducer output voltage can be obtained that is proportional to the difference in the currents, or equivalently the generated heat in the diaphragm.

It would be desirable if a method were available for performing a wafer-level test on a thermopile-based infrared sensor of the type taught by Chavan et al., by which the sensor performance can be evaluated to identify sensors outside acceptable performance ranges. It would be particularly desirable if such a wafer-level test were suitable for high-volume testing of mass-produced sensors.

BRIEF SUMMARY OF THE INVENTION

The present invention pertains to methods and an apparatus for testing an infrared sensor for the purpose of determining the functionality and/or sensitivity of the sensor to infrared radiation. The method and apparatus are particularly adapted for testing an infrared sensor having a diaphragm containing a heating element and a thermopile transducer that generates an output responsive to thermal energy.

According to a first aspect of the invention, a method is provided for assessing the sensitivity of infrared sensors. The method entails placing the sensor in an environment so as to cause the diaphragm to be at an environment temperature and so that the output of the transducer is at an environment-induced output level. The diaphragm of the sensor is then exposed to thermal radiation emitted by a first body so as to cause the diaphragm to be at a first temperature that is different from the environment temperature, such that the output of the transducer is at a first output level that is different from the environment-induced output level. Thereafter, the diaphragm is exposed to thermal radiation emitted by a second body so as to cause the diaphragm to be at a second temperature that is different from the environment temperature and different from the first temperature, such that the output of the transducer is at a second output level that is different from the environment-induced output level and different from the first output level. Exposure of the diaphragm to thermal radiation from the second body is then discontinued, causing the diaphragm to return to the environment temperature and the output of the transducer to substantially return to the environment-induced output level.

The method further involves flowing current through the heating element at a first input level adjusted so that the output of the transducer is substantially at the first output level (established by thermal radiation from the first body), and flowing current through the heating element at a second input level adjusted so that the output of the transducer is substantially at the second output level (established by thermal radiation from the second body). By computing the difference between the first and second output levels and computing the difference between the first and second input levels, a gauge factor can be calculated for the sensor by which the sensitivity of similarly designed sensors can be evaluated. A particularly notable example is the ability to assess an infrared sensor at the wafer or chip-level, and therefore prior to incurring the expense of packaging, calibrating, and testing the sensor.

According to a second aspect of the invention, a method is provided for assessing the functionality of infrared sensors. The method entails placing an infrared sensor in an environment so as to cause the diaphragm to be at an environment temperature and so that the output of the transducer is at an environment-induced output level. Current is then caused to flow through the heating element so that the output of the transducer is at a second operating output level. The functionality of the sensor is then assessed by determining whether the second operating output level of the transducer differs from the environment-induced output level. This aspect of the invention is particularly suitable for assessing the functionality of the sensor as an initial screening tool prior to packaging, as well as to assess the functionality of the sensor after it has been packaged and installed in its intended operating environment.

A preferred apparatus for this invention includes suitable means for carrying out the above-noted method. In particular, such an apparatus provides an environment at the environment temperature so that placing the sensor in the environment causes the diaphragm to be at the environment temperature so that the output of the transducer is at the environment-induced output level. The apparatus further includes a first unit that exposes the diaphragm of the sensor to thermal radiation emitted by the first body, and a second unit that exposes the diaphragm of the sensor to thermal radiation emitted by the second body. The apparatus is adapted to selectively prevent exposure of the diaphragm to thermal radiation emitted by the first and second bodies. Finally, the apparatus includes a unit that causes current to flow through the heating element at the input levels necessary to substantially reacquire the first and second output levels.

In view of the above, the invention makes use of a heating element within the diaphragm of a thermopile-based infrared sensor, such as the type taught by Chavan et al., to enable the functionality of the sensor to be determined at wafer/chip-level, package-level, and later in the intended operating environment of the sensor by confirming that the output of the sensor changes with a change in the input level to the heating element. Also in view of the above, the invention enables assessing the sensitivities of infrared sensors at wafer-level or chip-level, by which a determination can be made as to whether a given sensor is outside an acceptable performance range. For example, during the development phase of a sensor, a sufficient number of sensors can be evaluated to establish a correlation between the output of the sensor design due to change in temperature and its output due to change in heating element input, from which an acceptable range can be established for sensor output due to change in heating element input. This range can then be used as criteria for chip acceptance at wafer/chip-level test under high volume conditions.

Other objects and advantages of this invention will be better appreciated from the following detailed description.

DETAILED DESCRIPTION OF THE PREFERRED EMBODIMENT

The invention will be described in reference to an infrared sensor disclosed in U.S. Pat. No. 6,793,389 to Chavan et al., the content of which relating to the configuration and operation of the sensor is incorporated herein by reference. However, it will be appreciated that the invention is not limited to use with any particular sensor.

Figure 1:
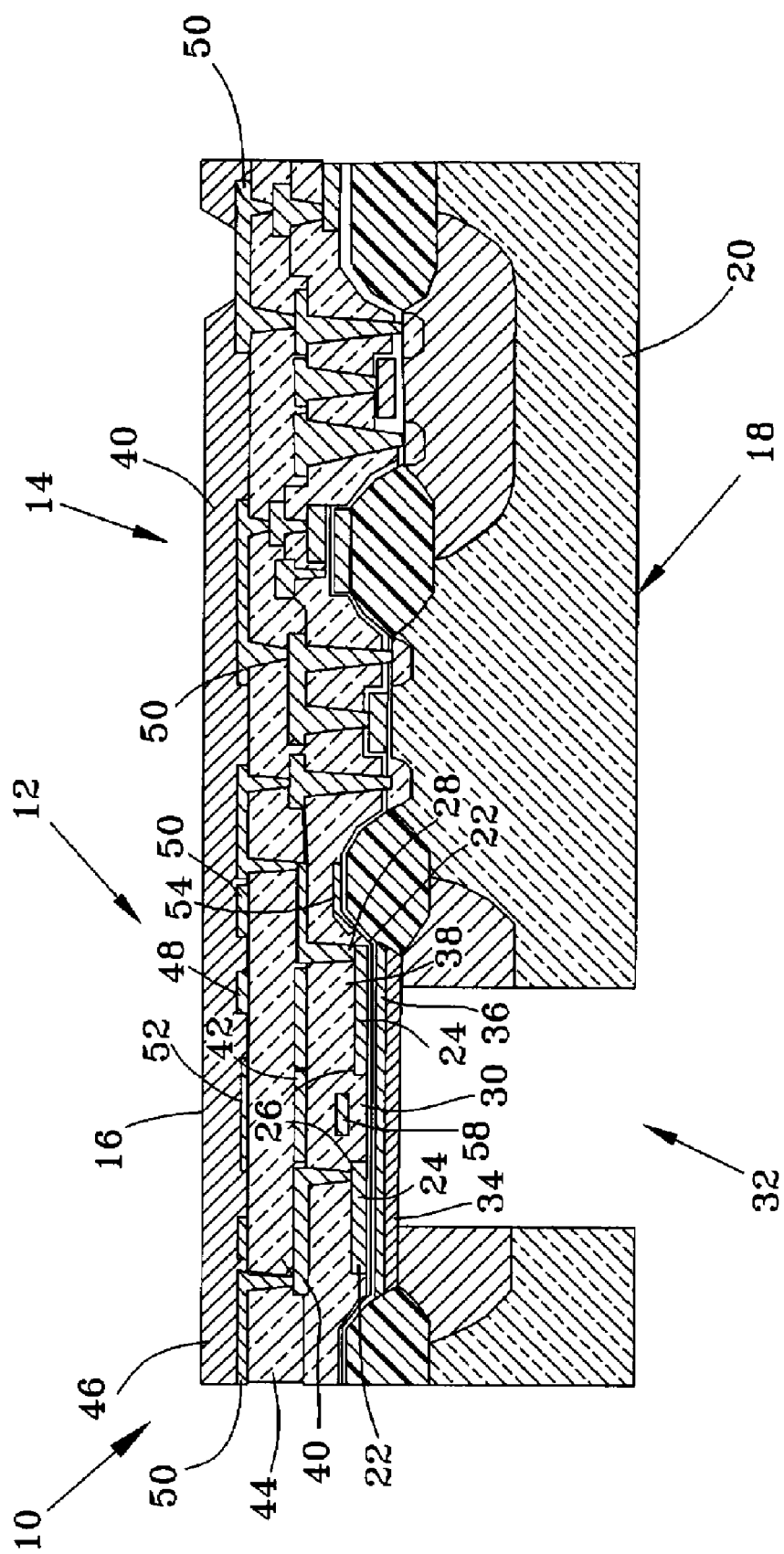
FIG. 1 represents a cross-section of a infrared sensor suitable for use with the present invention.

With reference to FIGS. 1 through 4, and particularly FIG. 1, an infrared sensor chip 10 is shown comprising a thermopile transducer 12 and signal processing circuitry 14, both of which are fabricated on a single semiconductor substrate 20 that may be formed of single-crystal silicon or another suitable semiconductor material. The thermopile transducer 12 is supported on a thin dielectric membrane, or diaphragm 16, which is surrounded by an undoped or lightly-doped (i.e., not heavily doped) support frame 18. Both the diaphragm 16 and its support frame 18 are defined by etching the backside of the substrate 20 to form a cavity 32. The signal conditioning circuitry 14 is represented as comprising complementary metal-oxide-semiconductor (CMOS) and bipolar devices fabricated on the frame 18 to provide on-chip interface/compensation circuitry for the output (in volts) of the transducer 12. Notably, the substrate 20 is undoped or lightly-doped because a heavily-doped substrate would be incompatible with the CMOS process preferred for the sensor taught by Chavan et al.

The diaphragm 16 and frame 18 support at least two interlaced thermopiles 22. In FIG. 1, the thermopiles 22 are shown supported with a pair of dielectric layers, one of which is preferably a thermal oxide layer 34 while the second is preferably a nitride film 36 formed by low-pressure chemical vapor deposition (LPCVD). The thermal oxide layer 34 can be grown during n-well drive-in during a standard CMOS process to be sufficiently thick to serve as an etch-stop when etching the substrate 20 to form a cavity 32 that delineates the multilayered diaphragm 16. The nitride film 36 is deposited and patterned after growing the thermal oxide layer 34. The nitride film 36 is preferably in tension to convert to tensile the net stress in the multilayer diaphragm 16, as discussed in U.S. patent application Publication No. 2003/0148620, the content of which relating to the fabrication of the sensor chip 10 is incorporated herein by reference.

Figure 2:
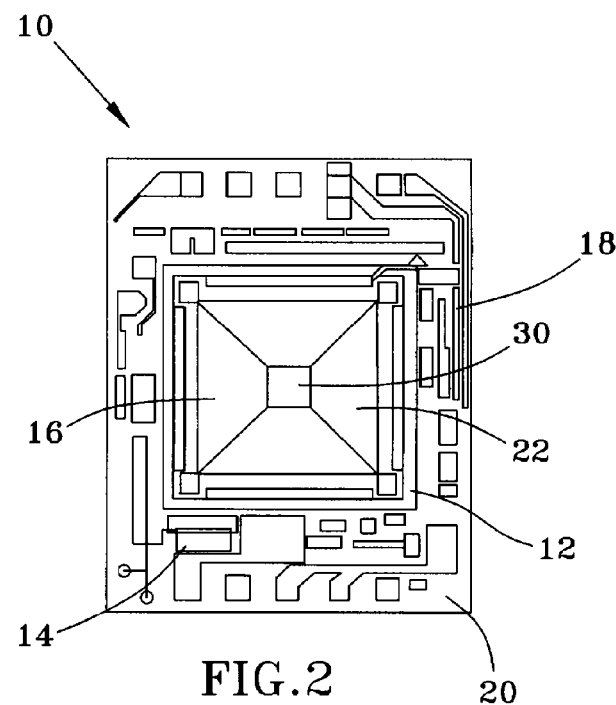
FIG. 2 is a plan view of the sensor represented in FIG. 1.
Figure 4:
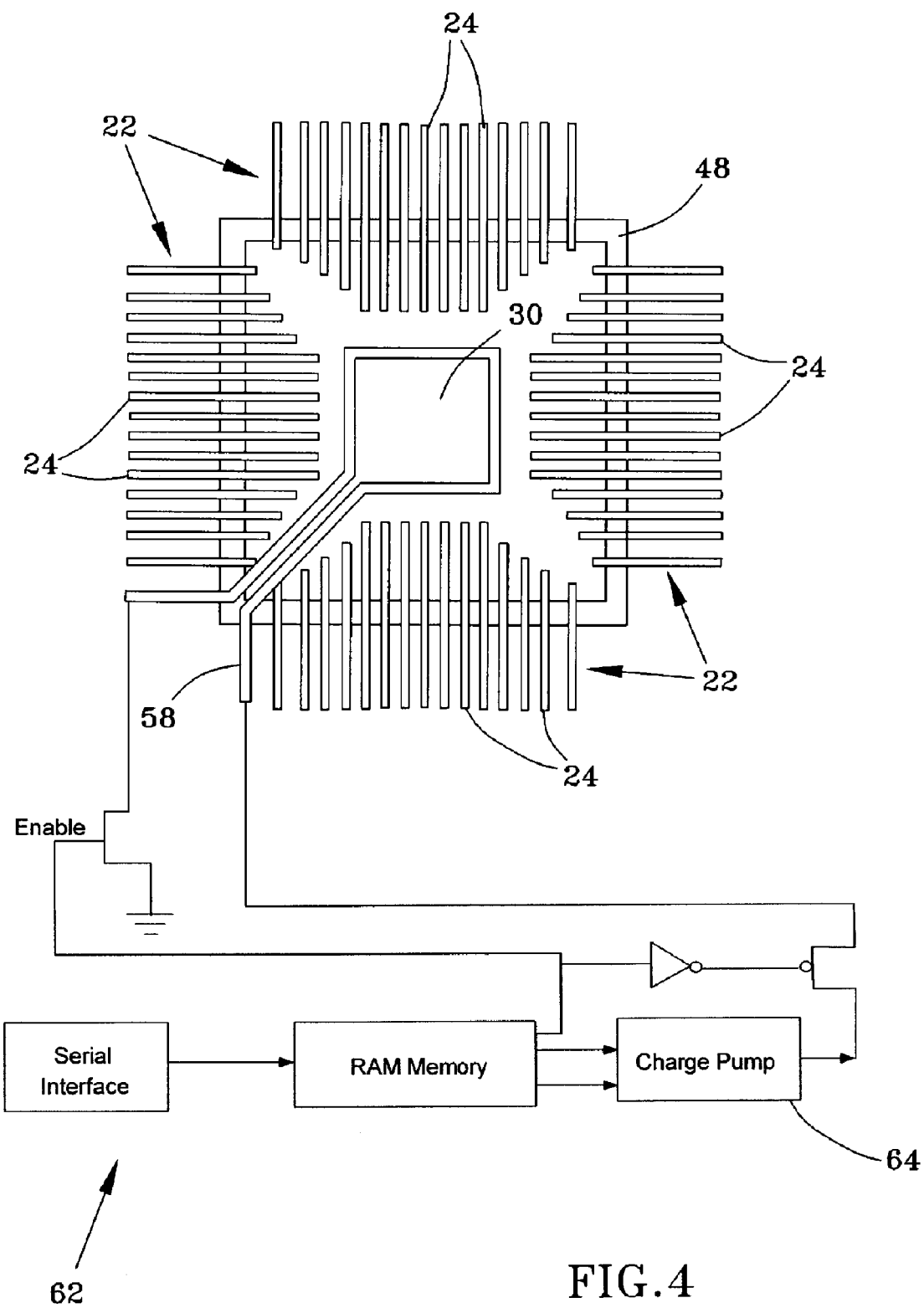
FIG. 4 shows a suitable location for a heating element relative to a preferred thermopile configuration for the sensor of FIG. 1, and by which electrical heating of the sensor can be performed in carrying out testing in accordance with the invention.

Each thermopile 22 comprises a sequence of thermocouples 24, with the thermocouples 24 of one thermopile 22 alternating with the thermocouples 24 of the second thermopile 22, hence the description of the thermopiles 22 being "interlaced." Each thermocouple 24 has a pair of junctions, referred to as hot and cold junctions 26 and 28, respectively, formed by dissimilar electrically-resistive materials. The dissimilar materials are preferably p or n-type polysilicon and aluminum, though other materials could be used, including p-type with n-type polysilicon. As seen in FIGS. 2 and 4, the diaphragm 16 has a rectangular (square) shape, and the thermocouples 24 are shortest at the corners of the diaphragm 16 and progressively increase in length therebetween. In this manner, the thermocouples 24 are arranged to define a pyramidal shape in the plane of the diaphragm 16, such that essentially the entire diaphragm 16 is occupied by either the thermopiles 22 or a central heat-absorption zone 30 surrounded by the thermopiles 22. The thermocouples 24 have their cold junctions 28 on the frame 18 and their hot junctions 26 on the diaphragm 16, whose upper surface is adapted for exposure to infrared radiation. When the hot junction 26 of each thermocouple 24 is subjected to a higher temperature than the cold junction 28 as a result of infrared radiation, the thermocouples 24 produce a measurable output voltage.

Contact is made to the hot and cold junctions 26 and 28 through vias defined in a dielectric layer 38 and a metallization layer 40 (Metal-1) that can be deposited and patterned to also define the metallization for the circuitry 14. The metallization layer 40 can be formed of, for example, Al-1% Si or another suitable metallization alloy, and the dielectric layer 38 may comprise a layer of phosphosilicate glass (PSG) or low temperature oxide (LTO). The dielectric layer 38 also preferably includes a layer of spin-on glass (SOG) for planarizing.

In addition to those materials discussed above, the diaphragm 16 preferably comprises additional layers of different materials to enhance infrared absorption and heat generation. In particular, the central heat-absorption zone 30 preferably contains layers of dielectric materials and metals that enhance infrared and heat absorption in the vicinity of the hot junctions 26. FIG. 1 shows an absorber/reflector metal 42 within the central heat-absorption zone 30 and located below two dielectric layers 44 and 46. The absorber/reflector metal 42 serves to reflect any unabsorbed radiation (i.e., traveling downward toward the cavity 32) back toward the infrared absorbing dielectric layers 44 and 46. The absorber/reflector metal 42 also sets up a standing wave of infrared electromagnetic radiation inside the dielectric layers 44 and 46. FIG. 1 shows another metal body in the form of a patterned tungsten silicide (W—Si) layer 52, which is embedded in the diaphragm 16 to increase infrared absorption within the central heat-absorption zone 30. At least one of the two dielectric layers 44 and 46 is preferably formed of an infrared absorption dielectric material such as oxynitride or a tetra-ethyl-ortho-silicate (TEOS)-based oxide. In a preferred embodiment, the uppermost dielectric layer 46 is formed of oxynitride, and the underlying dielectric layer 44 is a TEOS-based oxide. The oxynitride layer 46 is desirable as the outer layer of the diaphragm 16 because, similar to the LPCVD nitride film 36, oxynitride contributes to the creation of a tensile net stress within the diaphragm 16, again as discussed in co-pending U.S. Patent Application Publication No. 2003/0148620.

The diaphragm structure described above provides for dual absorption in the central heat-absorption zone 30, raising the temperature of the zone 30 above that of the surrounding area of the diaphragm 16 on which infrared radiation may also be incident. This, coupled with the heat loss that occurs at the support frame 18, creates a temperature gradient from the center of the sensor chip 10 to the edge of the diaphragm 16 that generates the Seebeck potential in the thermopiles 22. The combination of the absorber/reflector metal 42 below infrared absorbing dielectric layers 44 and 46 formed of oxynitride and a TEOS-based oxide provide good absorption (greater than 50%) of radiation of wavelengths of about eight to about fifteen micrometers, and good transmission (greater than 80%) for other wavelengths, creating what can be termed a thermal filter whereby heating of the diaphragm 16 can be proportional to a first order to the absorbed wavelengths only.

As shown in FIGS. 1 and 4, the sensor chip 10 also preferably has a heat equalization rim 48, which as shown can be deposited and patterned with a second metallization layer 50 (Metal-2) that interconnects the metallization layer 40 with the signal processing circuitry 14. The rim 48 is preferably patterned so that, in terms of alignment in the direction of radiation transmission through the diaphragm 16, the rim 48 surrounds the hot junctions 26 of the thermopiles 22. In this manner, the rim 48 promotes equalization of the temperature at the inside edge of the rim 48, which is accurately patterned, to the temperature of the support frame 18, instead of relying on the actual position of the perimeter of the diaphragm 16. The overall effect is to reduce the amount of temperature variation from one hot junction 26 to another, and from one cold junction 28 to another. The rim 48 thus promotes consistent behavior of the thermopiles 22 irrespective of any etching variations that might be introduced by the fabrication process, during which the backside of the substrate 20 is etched to define the diaphragm 16 and cavity 32.

According to U.S. Pat. No. 6,793,389 to Chavan et al., the thermopiles 22 are interlaced and the order of their thermocouple materials are reversed between adjacent thermocouples 24, so the output potential of one thermopile 22 increases directly proportional to an increase in temperature at its hotjunctions 26, and the output potential of the other thermopile 22 decreases in proportion to an increase in temperature at its hot junctions 26. The two resulting potentials are then conducted by the metallization layers 40 and 50 to the signal processing circuitry 14, operating as a sensitive impedance converter circuit to yield what may be termed the output of the transducer 12. This dual signal approach, or differential sensing, allows rejection of common-mode noise, thereby increasing the resolution of the sensor chip 10. In the BiCMOS process, the signals from the thermopiles 22 are preferably transferred to the circuitry 14 utilizing coaxial connection paths formed by the second metallization layer 50 and a polysilicon (Poly-1) layer 54 connected to ground potential.

Figure 3:
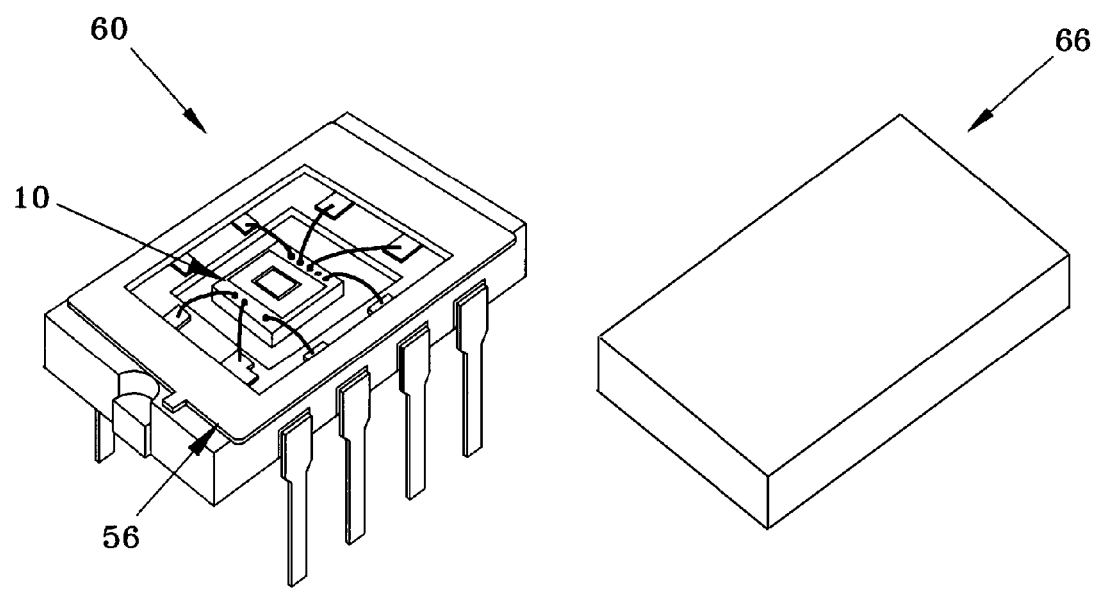
FIG. 3 is a perspective view of the sensor of FIG. 2 packaged in a CERDIP package equipped with a cap filter.

As seen in FIG. 1, the signal processing circuitry 14 for the thermopile transducer 12 is located on the support frame 18 where the cold junctions 28 of the thermopiles 22 are located. The circuitry 14 preferably comprises a four-stage signal processing path that includes noise reduction mechanisms and filtering, as described by Chavan et al. The sensor chip 10 can be mounted in industry standard metal or ceramic IC packages. Preferred packaging has the capability to enhance sensor performance and reduce cost. The sensor chip 10 can be mounted in a standard CERDIP (CERamic Dual In-line Package) 56, as represented in FIG. 3, or another ceramic cavity packaging arrangement to yield a sensor package 60 configured for installation within the intended operating environment of the sensor chip 10, for example, within a climate control system of an automobile. As shown in FIG. 3, the package 60 is adapted to receive a cap filter 66, such as coated silicon or other appropriate material, that encloses the chip 10. The material for the filter 66 is chosen so that radiation in the desired wavelength region, e.g., five to fifteen micrometers, reaches the chip 10.

Figure 6:
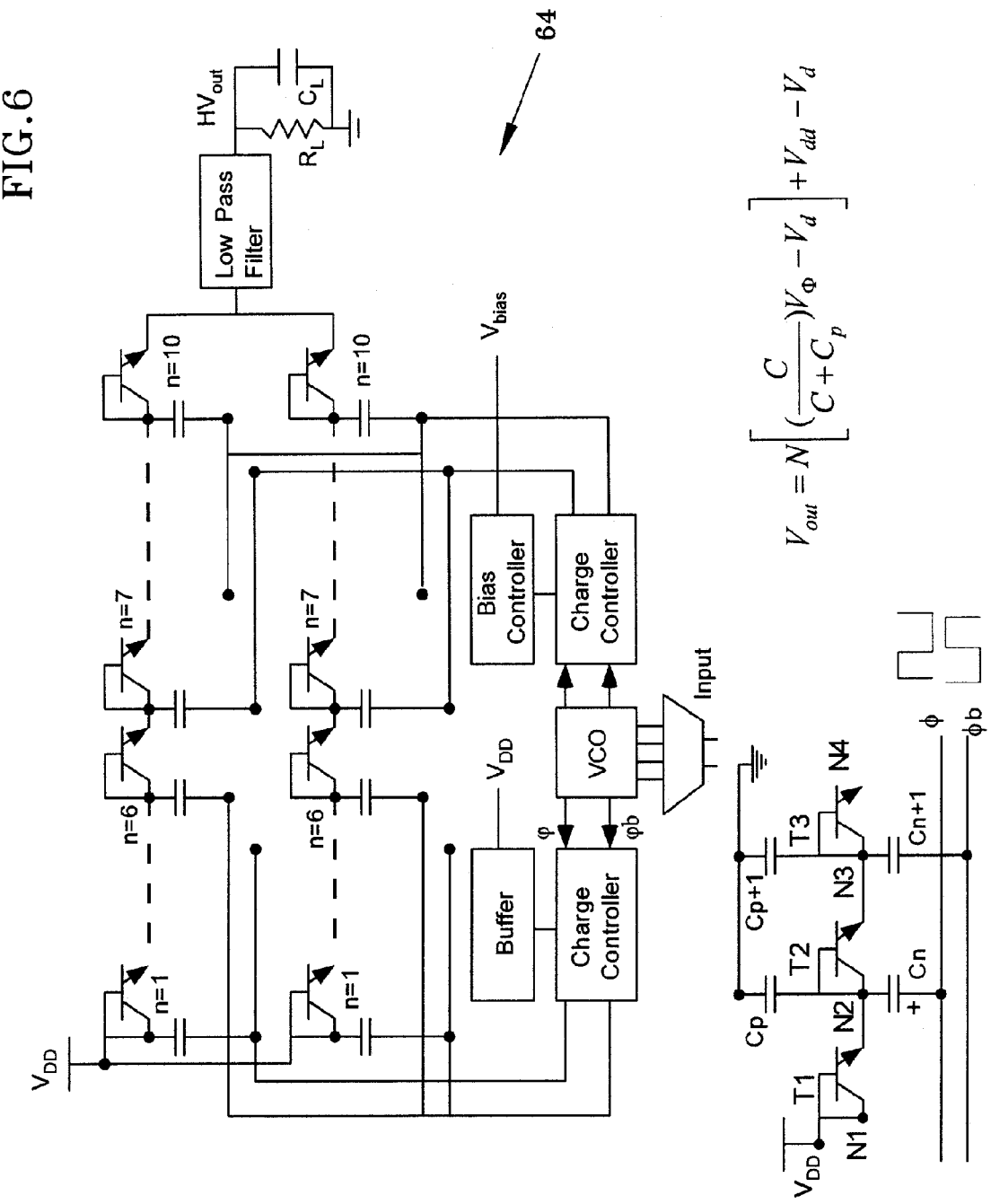
FIG. 6 shows an electrical schematic of a current-sourcing charge pump for controlling input voltage to the heating element when carrying out testing in accordance with the invention.

FIG. 4 is an isolated plan view of a subsurface region of the diaphragm 16, showing the sensor chip 10 as containing a heating element 58 within the central heat-absorption zone 30. The heating element 58 is formed of an electrically resistive material, and therefore generates heat when a current is passed through it. A particularly suitable material for the heating element 58 is polysilicon, a notable advantage of which is the capability of forming the heating element 58 with and in the plane of the aforementioned polysilicon layer 54, as represented in FIG. 1. The signal conditioning circuitry 14 on the sensor frame 14 preferably includes the associated electrical components 62 schematically depicted in FIG. 4. FIG. 6 is an electrical schematic of circuitry suitable for the charge pump 64 identified in FIG. 4 as controlling and delivering the input voltage to the heating element 58. The electrical components 62 are operable to switch current to the heating element 58, thereby raising the temperature of the central heat-absorption zone 30 of the diaphragm 16. Assuming all other variables are constant, the output voltage of the transducer 12 is a function of the voltage applied to the heating element 58. The power (P) necessary to span a desired output range of the transducer 12 is determined by the applied voltage (V) and the design resistance (R) of the heating element 58 ($P=V^2/R$). By switching between two or more different power levels, it is possible to obtain changes in transducer output voltage proportional to the differences in the power levels, corresponding to changes in the heat generated by the heating element 58 within the diaphragm 16.

The above-described capability is employed by the present invention as a self-test mechanism to determine at wafer level, as well as after packaging and installation in the field, whether the sensor chip 10 and its transducer 12 are functioning properly. While the following will be discussed in terms of testing the infrared sensor chip 10 depicted in FIGS. 1 through 4, the present invention as described below or with adaptations can be used to test a wide variety of thermal sensors suitably equipped with a heating element.

According to one aspect of the invention, the functionality of the sensor chip 10 at the wafer/chip level (before packaging) and/or package level (pre- and post-installation) can be evaluated through a self-test capability made possible by the presence of the heating element 58 within the diaphragm 16. By performing such a test at the wafer/chip level, non-functional chips can be identified and eliminated before incurring the expense of packaging, calibrating, and testing usually performed to produce a finished sensor package (e.g., 60 in FIG. 3) that is ready for installation in its intended application environment. With the capability of performing such a test at the package level, the proper function of the sensor chip 10 can be assessed in its application environment, and an appropriate warning provided in the case of sensor failure.

For functional testing at the wafer/chip-level, the sensor chip 10 is placed in an environment where a suitable ambient test temperature is maintained, such as within an oven. With the chip 10 at the test temperature, the electrical resistance of the heating element 58 and the environment-induced output voltage level of the sensor chip 10 are measured. With knowledge of the electrical resistance of the heating element 58, a suitable voltage input level to the heating element 58 can be calculated using the equation $V=(PR)^{1/2}$, where P is applied power level and R is the electrical resistance measured for the heating element 58. If the resulting electrical-induced output voltage level of the sensor chip 10 does not differ from the preceding environment-induced output voltage level, the chip 10 is identified as nonfunctional and eliminated from further processing.

For package-level functional testing of the sensor chip 10 in its application environment, the chip 10 can be tested at power-on to determine whether it has catastrophically failed. With no power applied to the heating element 58, the output voltage level of the transducer 12 induced by the application environment temperature of the sensor chip 10 is measured. A predetermined power level is then applied to the heating element 58 to achieve a suitable input voltage level, again based on the equation $V=(PR_O)^{1/2}$, where $R_O$ is the historical average electrical resistance for heating elements of sensors of the same design as the sensor chip 10 under test. Again, if the resulting electrical-induced output voltage level of the sensor chip 10 does not differ from the preceding environment-induced output voltage level, the chip 10 is identified as nonfunctional and an appropriate fault message can be displayed or otherwise registered for later retrieval.

While the above-described chip-level test would identify all nonfunctional chips before packaging, calibration, and final test, it can be appreciated that some sensor chips 10 that pass such a chip-level functional test could nonetheless fail calibration and final test. Accordingly, another aspect of the invention is to provide the capability of assessing the sensitivity of the sensor chip 10 at the wafer/chip level (before packaging). Such a capability is again made possible by the presence of the heating element 58 within the diaphragm 16, and involves the use of a method and apparatus described below to identify sensor chips 10 with sensitivities that are outside an acceptance range that is statistically determined as being necessary to pass a calibration process performed after packaging and before final testing. Inherently, such a sensitivity test must be more discriminating than the functionality tests described above.

Figure 5:
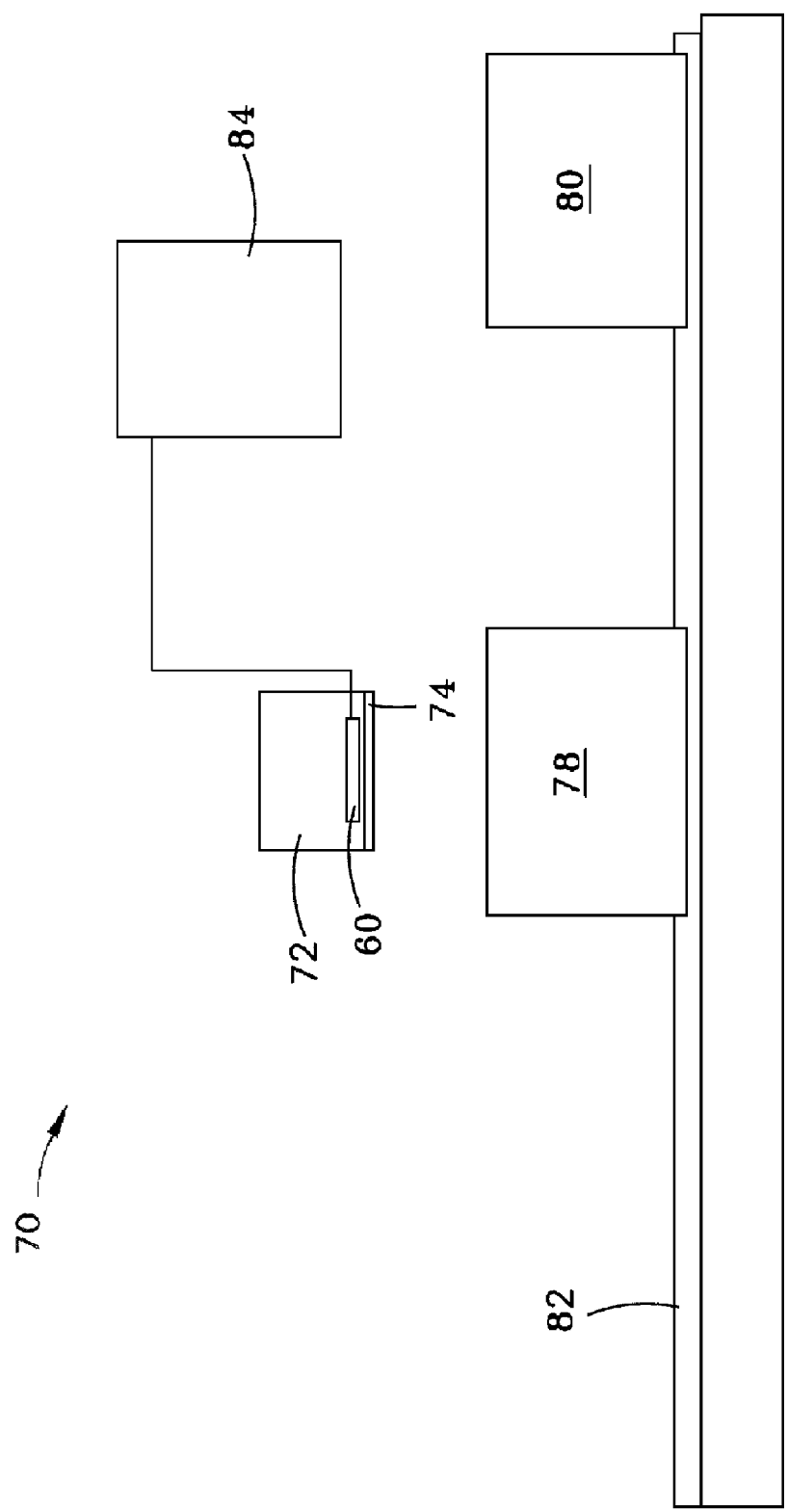
FIG. 5 schematically represents an apparatus suitable for carrying out testing in accordance with the invention.

An apparatus 70 for carrying out the sensitivity test of this invention is represented in FIG. 5 as including an oven 72 in which one or more packaged sensors 60 (FIG. 3) are enclosed and maintained at what will be referred to as an environment temperature ($T_A$), with the result that the output voltages of each packaged sensor 60 is at an environment-induced output level ($V_{O,A}$). The oven 72 is equipped with a transparent window 74, allowing unfiltered radiation to impinge on the diaphragms 16 of the chips 10 in the sensor packages 60. Located in a facing relationship to the oven 72 is a standard blackbody radiation source 78. As understood in the art, the source temperature ($T_1$) and its radiated spectrum are accurately known for blackbody radiation sources that are commercially available and suitable for use in the apparatus 70.

The blackbody radiation source 78 is shown in FIG. 5 mounted along with a second identical radiation source 80 on a track 82. The righthand radiation source 80 (as viewed in FIG. 5) is maintained at a temperature ($T_2$) above the environment temperature ($T_A$) within the oven 72 and different from the lefthand radiation source 78. In a preferred embodiment, the temperatures ($T_1$, $T_2$) of the radiation sources 78 and 80 are at or near the operating extremes of the intended application environment of the packaged sensors 60. The radiation sources 78 and 80 are movable on the track 82 such that, while only the lefthand radiation source 78 is shown in FIG. 5 as being aligned with the oven 72, both radiation sources 78 and 80 can be moved in a leftward direction to result in a configuration in which only the righthand radiation source 80 is aligned with the oven 72. While FIG. 5 shows the radiation sources 78 and 80 as being the movable components of the apparatus 70, the oven 72 could be adapted for movement as well or instead of the radiation sources 78 and 80.

By aligning the lefthand radiation source 78 with the oven as shown in FIG. 5, infrared radiation emitted by the radiation source 78 is able to pass through the transparent window 74 of the oven 72 and the filter 66 on the sensor package 60 to impinge on the diaphragms 16 of the chips 10 within the oven 72. In so doing, the temperature of each sensor diaphragm 16 increases and is proportional to the temperature ($T_1$) of the radiation source 78, raising the output voltage of the packaged sensor 60 to what will be termed a first radiation-induced output level ($V_{0,1}$) that is preferably higher than the environment-induced output voltage ($V_{O,A}$) produced as a result of the environment temperature ($T_A$) within the oven 72.

Once the first radiation-induced output level ($V_{0,1}$) is registered for the packaged sensors 60, such as by outputting to a computer 84 or other device capable of recording the output, the lefthand radiation source 78 is shifted leftward out of alignment with the oven 72. Without receiving thermal radiation from the radiation source 78, the output of the packaged sensor 60 in the oven 72 at the environment temperature ($T_A$) substantially returns to the environment induced output level ($V_{O,A}$). Once stabilized, a controlled voltage input level ($V_{1,1}$) can be applied to the heating element 58 (such as with the electrical components 62 of FIG. 4), causing the temperature of the sensor diaphragm 16 to rise and the output voltage of the packaged sensor 60 to shift and eventually become stable at a first electrical-induced output level. In the preferred embodiment, the first electrical-induced output level is substantially equal to the first radiation-induced output level ($V_{0,1}$). The power level ($P_{1,1}$) corresponding to the voltage input level ($V_{1,1}$) can be calculated from the equation $P_{1,1}=V_{1,1}^2/R$, where R is the measured electrical resistance of the heating element 58. In this manner the power ($P_{1,1}$) required to be applied to the heating element 58 to simulate the first thermal radiation ($T_1$) is identified.

The righthand radiation source 80 can then be moved leftward into alignment with the oven 72, so that the diaphragm 16 of the packaged sensor 60 is exposed to the thermal radiation emitted by the radiation source 80. Because the righthand radiation source 80 is at a temperature ($T_2$) different from the temperature ($T_1$) of the lefthand radiation source 78, the output voltage of the packaged sensor 60 is shifted to a second radiation-induced output level ($V_{0,2}$) that is different from the first radiation-induced output level ($V_{0,1}$), preferably higher than the environment-induced output level ($V_{0,A}$). After registering the second radiation-induced output level ($V_{0,2}$) for the packaged sensor 60 (e.g., recorded with the computer 84), the righthand radiation source 80 is shifted out of alignment with the oven 72, and the output of the packaged sensor 60 in the oven 72 at the environment temperature ($T_A$) substantially returns to the environment-induced output level ($V_{0,A}$). Once stabilized, a controlled voltage input level ($V_{1,2}$) can be applied to the heating element 58 to cause the temperature of the sensor diaphragm 16 to rise and the output voltage of the packaged sensor 60 to shift and eventually become stable at a second electrical-induced output level. In the preferred embodiment, the second electrical-induced output level is substantially equal to the second radiation-induced output level ($V_{0,2}$). The power level ($P_{1,2}$) corresponding to the voltage input level ($V_{1,2}$) can then be calculated from the equation $P_{1,2}=V_{1,2}^2/R$, where R is the measured electrical resistance of the heating element 58. In this manner the power ($P_{1,2}$) required to be applied to the heating element 58 to simulate the second thermal radiation ($T_2$) is identified.

To promote the ability to identify sensor chips 10 at the chip level that will have sensitivities outside an acceptable range following packaging, the above procedure and apparatus 70 are initially employed to evaluate sensor chips 10 at both the chip-level (wafer-level) and package-level in order to develop a chip-level screening process. In a preferred embodiment, the apparatus 70 is employed as described above to evaluate a sensor package 60 in which the sensor chip 10 of interest is packaged. This portion of the screening process identifies the power input levels ($P_{1,1}$, $P_{1,2}$) that must be applied to the heating element 58 of the chip 10 to simulate the first and second thermal radiation loads ($T_1$, $T_2$).

A plurality of sensor chips 10 of the same design, preferably at wafer level, are then obtained for testing with the apparatus 70. The number of sensors 10 should be sufficient to provide a statistical basis for reliably predicting the performance of identically produced chips 10 using the same production process. With the chips 10 under test held at the environmental temperature ($T_A$) within the oven 72, the resistance of the heating element 58 ($R_H$) and the environment-induced output level ($V_{O,A}$) of each chip 10 are measured. The input voltage levels ($V_{I1}$, $V_{I2}$) necessary to simulate the first and second thermal radiation loads ($T_1$, $T_2$) are then calculated with the equation $V_I=(P_IR_H)^{1/2}$ where $P_I$ is the power input levels ($P_{I,1}$, $P_{I,2}$) determined when testing the sensor package 60. While held within the oven 72, the first voltage input level ($V_{I1}$) and then the second voltage input level ($V_{I2}$) are applied to the heating element 58 of each chip 10, such as with the computer 84, to generate first and second electrical-induced output voltage levels ($V'_{O1}$ and $V'_{O2}$, respectively). This procedure is repeated for a statistically significant number of chips 10 on several wafers, and a chip-level gauge factor calculated by the computer 84 for each chip 10 as follows: $G_{CL}=(V'_{O2}-V'_{O1})/(P_{I2}-P_{I1})$. The identity of each tested chip 10 is stored by the computer 84, after which the chips 10 are packaged. The identical test is then performed on the same chips 10 after packaging, generating a second set of electrical-induced output voltage levels ($V''_{O1}$, $V''_{O2}$) by which a package level gauge factor is calculated for each chip as follows: $G_{PL}=(V''_{O2}-V''_{O1})/(P_{I2}-P_{I1})$.

The computer 84 is then used to determine a correlation between the chip-level and package-level gauge factors $G_{CL}$ and $G_{PL}$ of each chip 10. Thereafter, the packaged sensor chips 10 are calibrated and tested to the appropriate final specification for the chips 10 in the particular application. Those chips 10 whose calibrations do not fall within the final specification are identified and eliminated from further processing.

From the correlation between $G_{CL}$ and $G_{PL}$ for all tested chips 10, and with the knowledge of which chips 10 did not meet the final specification following calibration, a chip-level gauge factor range ($G_{Lower}$ to $G_{upper}$) can be established for subsequently produced and packaged sensors 10 based on the chip-level gauge factors $G_{CL}$ of those packaged sensors 10 whose calibrations did and did not fall within the acceptable calibration range. In particular, subsequently manufactured chips 10 can be tested at wafer level while held substantially at the environment temperature ($T_A$) and input voltage levels ($V_{I1}$, $V_{I2}$) are applied to simulate thermal radiation loads ($T_1$, $T_2$), from which a chip-level gauge factor $G_{CL}$ can be calculated for each chip 10. Any chip 10 found at wafer level to have a chip-level gauge factor $G_{CL}$ below $G_{Lower}$ or above $G_{Upper}$ can be eliminated prior to packaging and calibration on the basis that the chip 10 is statistically predicted to not calibrate to the final specification.

While the invention has been described in terms of a preferred embodiment, it is apparent that other forms could be adopted by one skilled in the art. For example, the appearance, construction, and materials of the sensor chip 10 could differ from the embodiment shown in the Figures, and the method of this invention could be performed using essentially any type of apparatus and/or equipment capable of controllably heating the thermopiles through radiation impingement and internal (e.g., resistive) heating. Accordingly, the scope of the invention is to be limited only by the following claims.

What is claimed is:

1. A method of testing a first infrared sensor having a diaphragm containing a heating element and a transducer that generates an output responsive to temperature, the method comprising the steps of:

placing the first infrared sensor in an environment so as to cause the diaphragm to be at an environment temperature and so that the output of the transducer is at an environment-induced output level;

exposing the diaphragm of the first infrared sensor to thermal radiation emitted by a first body so as to cause the diaphragm to be at a first temperature that is different from the environment temperature and the output of the transducer is at a first output level that is different from the environment-induced output level;

exposing the diaphragm of the first infrared sensor to thermal radiation emitted by a second body so as to cause the diaphragm to be at a second temperature that is different from the environment temperature and different from the first temperature and the output of the transducer is at a second output level that is different from the environment-induced output level and different from the first output level; and while the diaphragm is not exposed to thermal radiation from the first and second bodies and the diaphragm is substantially at the environment temperature, causing current to flow through the heating element at a first input level so that the output of the transducer is substantially at the first output level, and causing current to flow through the heating element at a second input level so that the output of the transducer is substantially at the second output level.

2. The method according to claim 1, wherein the step of causing current to flow through the heating element at the first input level is performed after the step of exposing the diaphragm to thermal radiation emitted by the first body and before exposing the diaphragm to thermal radiation emitted by the second body.

3. The method according to claim 1, wherein the step of causing current to flow through the heating element at the second input level is performed after the steps of exposing the diaphragm to thermal radiation emitted by the first and second bodies.

4. The method according to claim 3, further comprising the step of packaging the first infrared sensor within a package, wherein the first infrared sensor is within the package during each step of the method.

5. The method according to claim 4, further comprising the steps of:
providing a first plurality of additional sensors substantially identical to the first infrared sensor, whereby each of the first plurality of additional sensors has a diaphragm containing a heating element and a transducer that generates an output responsive to temperature;
while the diaphragm of each of the first plurality of additional sensors is substantially at the environment temperature so that the output of the transducer thereof is substantially at the environment-induced output level, causing current to flow through the heating element thereof at substantially the first input level so that the output of the transducer is at a first electrically-induced output level, and causing current to flow through the heating element at substantially the second input level so that the output of the transducer is at a second electrically-induced output level; and
computing a first gauge factor for each of the first plurality of additional sensors that correlates an output difference between the first and second electrically-induced output levels thereof and an input difference between the first and second input levels thereof.

6. The method according to claim 5, wherein none of the first plurality of additional sensors is within a package while current is caused to flow through the heating element thereof.

7. The method according to claim 6, further comprising the step of individually packaging each of the first plurality of additional sensors within a package, whereby the first plurality of additional sensors are packaged sensors.

8. The method according to claim 7, further comprising the steps of:
while the diaphragm of each of the packaged sensors is substantially at the environment temperature so that the output of the transducer thereof is substantially at the environment-induced output level, causing current to flow through the heating element thereof at substantially the first input level so that the output of the transducer is at a third electrically-induced output level, and causing current to flow through the heating element at substantially the second input level so that the output of the transducer is at a fourth electrically-induced output level; and
computing a package-level gauge factor for each of the packaged sensors that correlates the output difference between the third and fourth electrically-induced output levels thereof and the input difference between the first and second input levels thereof.

9. The method according to claim 8, further comprising the steps of:
calibrating the packaged sensors;
identifying any of the packaged sensors whose calibration does not fall within a predetermined acceptable calibration range; and
establishing an acceptable chip-level gauge factor range for the packaged sensors based on the first gauge factors of the packaged sensors whose calibrations did fall within the predetermined acceptable calibration range.

10. The method according to claim 9, further comprising performing acceptance testing on a second plurality of additional sensors substantially identical to the first plurality of additional sensors and prior to packaging of the second plurality of additional sensors, whereby each of the second plurality of additional sensors has a diaphragm containing a heating element and a transducer that generates an output responsive to temperature, the acceptance testing comprising the steps of:
while the diaphragm of each of the packaged sensors is substantially at the environment temperature so that the output of the transducer thereof is substantially at the environment-induced output level,
while the diaphragm of each of the second plurality of additional sensors is substantially at the environment temperature so that the output of the transducer thereof is substantially at the environment-induced output level, causing current to flow through the heating element thereof at substantially the first input level so that the output of the transducer is at a fifth electrically-induced output level, and causing current to flow through the heating element at substantially the second input level so that the output of the transducer is at a sixth electrically-induced output level;
computing a chip-level gauge factor for each of the second plurality of additional sensors that correlates an output difference between the fifth and sixth electrically-induced output levels thereof and an input difference between the first and second input levels thereof;
scrapping any of the second plurality of additional sensors whose chip-level gauge factors did not fall within the acceptable chip-level gauge factor range.

11. The method according to claim 1, further comprising steps to evaluate the functionality of a second infrared sensor that is substantially identical to the first infrared sensor and thereby has a diaphragm containing a heating element and a transducer that generates an output responsive to temperature, the evaluation steps comprising:
placing the second infrared sensor in a test environment so as to cause the diaphragm thereof to be at a test temperature and so that the output of the transducer thereof is at a test-induced output level;
causing current to flow through the heating element thereof so that the output of the transducer thereof is at a second operating output level; and scrapping the second infrared sensor if the second operating output level does not differ from the test-induced output level thereof.

12. The method according to claim 11, wherein the second infrared sensor is not within a package while current is caused to flow through the heating element thereof.

13. The method according to claim 1, further comprising steps to evaluate the functionality of an infrared sensor package containing a second infrared sensor substantially identical to the first infrared sensor so as to have a diaphragm containing a heating element and a transducer that generates an output responsive to temperature, the infrared sensor package being installed in an operating environment at an operating temperature so as to cause the diaphragm thereof to be at the operating temperature and the output of the transducer thereof is at a first operating output level, the evaluation steps comprising:
 causing current to flow through the heating element of the second infrared sensor so that the output of the transducer thereof is at a second operating output level; and
 generating a fault report if the second operating output level does not differ from the first operating output level.

14. The method according to claim 13, wherein the infrared sensor package is installed in an automobile.

15. A method of testing an infrared sensor having a diaphragm containing a heating element and a transducer that generates an output responsive to temperature, the method comprising the steps of:
 placing the infrared sensor in an environment so as to cause the diaphragm to be at an environment temperature and so that the output of the transducer is at an environment-induced output level;
 causing current to flow through the heating element so that the output of the transducer is at a second operating output level; and
 determining whether the second operating output level of the transducer differs from the environment-induced output level.

16. The method according to claim 15, wherein the infrared sensor is not within a package while current is caused to flow through the heating element.

17. The method according to claim 16, further comprising the step of scrapping the infrared sensor if the second operating output level does not differ from the environment-induced output level.

18. The method according to claim 15, wherein the infrared sensor is within a sensor package and the sensor package is installed in an operating environment.

19. The method according to claim 18, further comprising the step of generating a fault report if the second operating output level does not differ from the environment-induced output level.

20. The method according to claim 18, wherein the sensor package is installed in an automobile.

21. An apparatus for testing an infrared sensor having a diaphragm containing a heating element and a transducer that generates an output responsive to temperature, the apparatus comprising:
 an environment at an environment temperature so that placing the infrared sensor in the environment causes the diaphragm to be at the environment temperature and so that the output of the transducer is at an environment-induced output level;
 means for exposing the diaphragm of the infrared sensor to thermal radiation emitted by a first body at a temperature that is different from the environment temperature so as to cause the output of the transducer to be at a first output level that is different from the environment-induced output level;
 means for exposing the diaphragm of the infrared sensor to thermal radiation emitted by a second body at a temperature that is different from the environment temperature and different from the temperature of the first body so as to cause the output of the transducer to be at a second output level that is different from the environment-induced output level and different from the first output level;
 means for substantially preventing exposure of the diaphragm to thermal radiation emitted by the first and second bodies so as to cause the diaphragm to be at the environment temperature;
 means for causing current to flow through the heating element at a first input level so that the output of the transducer is substantially at the first output level; and
 means for causing current to flow through the heating element at a second input level so that the output of the transducer is substantially at the second output level.

22. The apparatus according to claim 21, wherein the environment at the environment temperature is an oven.

23. The apparatus according to claim 22, wherein the means for exposing the diaphragm of the infrared sensor to thermal radiation emitted by the first body and the means for exposing the diaphragm of the infrared sensor to thermal radiation emitted by the second body are operable to move the first and second bodies relative to the oven.

24. The apparatus according to claim 21, wherein the means for exposing the diaphragm of the infrared sensor to thermal radiation emitted by the first body and the means for exposing the diaphragm of the infrared sensor to thermal radiation emitted by the second body are operable to move the first and second bodies relative to the oven.

25. The apparatus according to claim 21, further comprising means for computing an output difference between the first and second output levels.

26. The apparatus according to claim 21, further comprising means for computing an input difference between the first and second input levels.

27. The apparatus according to claim 21, further comprising means for computing a gauge factor for the infrared sensor that correlates an output difference between the first and second output levels and an input difference between the first and second input levels.

* * * * *